United States Patent
Gailus

(10) Patent No.: US 12,371,849 B2
(45) Date of Patent: Jul. 29, 2025

(54) YARN FOR REINFORCING COMPOSITE MATERIALS

(71) Applicant: NANOCOMP TECHNOLOGIES, INC., The Woodlands, TX (US)

(72) Inventor: David W. Gailus, Merrimack, NH (US)

(73) Assignee: Nanocomp Technologies Inc.

( * ) Notice: Subject to any disclaimer, the term of this patent is extended or adjusted under 35 U.S.C. 154(b) by 760 days.

(21) Appl. No.: 17/331,305

(22) Filed: May 26, 2021

(65) Prior Publication Data

US 2021/0277594 A1 Sep. 9, 2021

Related U.S. Application Data

(62) Division of application No. 15/441,673, filed on Feb. 24, 2017, now abandoned.

(Continued)

(51) Int. Cl.
| | |
|---|---|
| *B32B 5/00* | (2006.01) |
| *B32B 7/08* | (2019.01) |
| *B32B 27/08* | (2006.01) |
| *C01B 32/16* | (2017.01) |
| *D02G 3/16* | (2006.01) |
| *D06M 15/37* | (2006.01) |
| *D06M 15/53* | (2006.01) |
| *D06M 15/55* | (2006.01) |
| *D06M 15/564* | (2006.01) |
| *D06M 15/59* | (2006.01) |

(Continued)

(52) U.S. Cl.
CPC ............ *D06M 15/70* (2013.01); *B32B 5/00* (2013.01); *B32B 7/08* (2013.01); *B32B 27/08* (2013.01); *C01B 32/16* (2017.08); *D02G 3/16* (2013.01); *D06M 15/37* (2013.01); *D06M 15/53* (2013.01); *D06M 15/55* (2013.01); *D06M 15/564* (2013.01); *D06M 15/59* (2013.01); *D06M 15/61* (2013.01); *D06M 23/005* (2013.01); *B32B 2038/008* (2013.01); *B32B 2250/24* (2013.01); *B32B 2305/076* (2013.01); *B32B 2307/518* (2013.01); *B32B 2307/546* (2013.01); *D06M 2101/40* (2013.01); *D10B 2101/122* (2013.01); *D10B 2505/02* (2013.01)

(58) Field of Classification Search
CPC ..................................... B32B 5/00
See application file for complete search history.

(56) References Cited

U.S. PATENT DOCUMENTS

| | | | | |
|---|---|---|---|---|
| 2002/0160146 A1* | 10/2002 | Homma | ............ | D04B 21/165 428/113 |
| 2009/0004460 A1* | 1/2009 | Gruber | ............ | C08K 7/24 428/323 |
| 2010/0021682 A1* | 1/2010 | Liang | ............ | D04H 1/4374 427/322 |

FOREIGN PATENT DOCUMENTS

| | | | |
|---|---|---|---|
| DE | 4215177 A1 | * | 11/1993 |
| GB | 1593668 A | * | 7/1981 |
| JP | 2002-317371 A | * | 10/2002 |

OTHER PUBLICATIONS

Jung, Yeonsu, Taehoon Kim, and Chong Rae Park. "Effect of polymer infiltration on structure and properties of carbon nanotube yarns." Carbon 88 (2015): 60-69.*

(Continued)

*Primary Examiner* — Jeffry H Aftergut
(74) *Attorney, Agent, or Firm* — Nanocomp Technologies Inc.; David K. Wooten

(57) ABSTRACT

A yarn for reinforcing composite material includes carbon nanotubes. The yarn has also been treated to promote interaction with a resinous matrix.

13 Claims, 1 Drawing Sheet

Related U.S. Application Data

(60) Provisional application No. 62/299,143, filed on Feb. 24, 2016.

(51) Int. Cl.
*D06M 15/61* (2006.01)
*D06M 15/70* (2006.01)
*D06M 23/00* (2006.01)
B32B 38/00 (2006.01)
D06M 101/40 (2006.01)

(56) References Cited

OTHER PUBLICATIONS

Vigolo, Brigitte, Philippe Poulin, Marcel Lucas, Pascale Launois, and Patrick Bernier. "Improved structure and properties of single-wall carbon nanotube spun fibers." Applied Physics Letters 81, No. 7 (2002): 1210-1212.*

* cited by examiner

YARN FOR REINFORCING COMPOSITE MATERIALS

RELATED APPLICATIONS

This application is a divisional application of U.S. Ser. No. 15/441,673 filed Feb. 24, 2017, currently pending, which claimed priority to U.S. Provisional Application No. 62/299,143 filed Feb. 24, 2016. The entire contents of the aforementioned applications are incorporated by reference herein.

FIELD OF INVENTION

The invention relates to composite materials, and in particular, to suppressing delamination of such materials.

BACKGROUND

Composite materials are typically made of layers that have been joined together. As a result, a composite material is inherently anisotropic. Its response to force is a function of the direction of the force vector.

For forces that come from certain favored directions, the composite material is remarkably strong. However, the same force, when acting in a disfavored direction, can have catastrophic results. This is because the composite material has a tendency to delaminate.

To address these undesirable characteristics, it is useful to reinforce the material in some way.

SUMMARY

In one aspect, the invention features a yarn made of carbon nanotubes. The yarn has been treated to promote interaction with a resinous matrix, such as that which one might find in the interstitial spaces of a composite material.

In some embodiments, the yarn has also been treated to enable a stitching machine to use the yarn to stitch into a composite material. This could be carried out by treating the yarn with sizing, with spalling, or with graphite, for example with spalling that includes graphite. It can also be carried out by treating the yarn with friction-reducing film, either in liquid or solid form.

In some embodiments, the yarn includes pre-treatment resin with which it has been infiltrated. This pre-treatment resin is one that has been selected to fuse with a resinous matrix of a composite material.

In some embodiments, the yarn includes epoxy, such as B-stage epoxy, with which it has been treated.

In other embodiments, the yarn includes thermoplastic with which it has been treated. Examples of such thermoplastic include PEEK, PEI, urethane-based plastic, and thermoplastic polyimide.

In other embodiments, the yarn includes thermoset material with which it has been treated. Examples of suitable thermoset materials include epoxy, and polyimide.

In other embodiments, the yarn has been treated to promote absorption of resinous material.

In yet other embodiments, the yarn has been treated to promote swelling upon exposure to resinous material.

Further embodiments include a plurality of layers having interstitial spaces filled with the resinous matrix. In these embodiments, the yarn passes through the layers. Among these are embodiments in which, as a result of having absorbed liquid from the resinous matrix, the yarn has become swollen, and those in which the yarn has formed mechanical interlocks with the resinous matrix.

Embodiments further include those in which the carbon nanotubes are single-walled nanotubes and those in which they are multi-walled nanotubes.

In some embodiments, the carbon nanotubes are manufactured at high temperatures, for example, above 1000 C, and preferably at 1100 C. Such carbon nanotubes tend to be longer and thinner than those formed at lower temperature, and are thus more amenable to being wound into yarn.

Another aspect of the invention is a method that includes forming carbon nanotubes, spinning the carbon nanotubes into a yarn, and treating the yarn to promote interaction with a resinous matrix.

Among the various practices of this method are those that include treating the yarn to enable a stitching machine to use the yarn to stitch into a composite material. These can include treating the yarn with sizing, with spalling, and with graphite. Also among these practices are those that include treating the yarn with friction-reducing film, whether in solid or liquid form.

Other practices include infiltrating the yarn with a pre-treatment resin selected to fuse with a resinous matrix of a composite material. Examples include epoxy and B-stage epoxy.

Yet other practices of the invention include treating the yarn with thermoplastic, examples of which include PEEK, PEI, urethane-based plastic, and thermoplastic polyimide.

Additional practices include treating the yarn with thermoset material, such as epoxy and polyimide.

Further practices include treating the yarn to promote absorption of resinous material and treating the yarn to promote swelling upon exposure to resinous material.

In some practices, forming the nanotubes includes forming single-walled nanotubes. However, in other practices, forming nanotubes includes multi-walled nanotubes.

Yet other practices feature the use of high temperatures during the formation of carbon nanotubes. Carbon nanotubes formed at high temperatures tend to be longer and thinner than those formed at lower temperature, and are thus more amenable to being wound into yarn. Among these practices are those in which the nanotubes are formed at temperatures above 1000 C, and preferably at 1100 C.

These and other features and advantages of the invention will be apparent from the following detailed description and the accompanying figures, in which:

DETAILED DESCRIPTION

Figure 1:
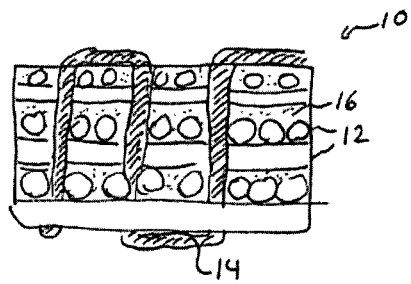
FIG. 1 shows a composite material reinforced with a yarn.

FIG. 1 shows a reinforced composite material 10 having a plurality of layers 12 oriented parallel to a material plane. The layers have been stitched together by a yarn 14 that passes through all the layers 12. In the particular embodiment shown, the yarn 14 passes through the layers in a direction normal to the material plane. However, this need not be the case. In other embodiments, the yarn 14 passes through the layers at an angle. In either case, the presence of this yarn 14 tends to suppress the possibility of delamination in response to an impulsive force acting in this normal direction.

A suitable yarn 14 is one made of carbon nanotubes that are long enough to spin into a fiber that can then be used to make the yarn 14. In some cases, these nanotubes have one wall. In others, they have two or more coaxial walls. Unlike conventional nanotubes, which are formed at lower temperatures of 600-700 C, the nanotubes to be spun into a fiber are formed at higher temperatures, typically above 1000 C, and preferably at or around 1100 C. This results in formation of nanotubes that are longer and thinner than those formed at lower temperatures and that are therefore more suitable for spinning into a fiber.

In some embodiments, the yarn 14 is made of four strands of carbon nanotube fibers that have been twisted together to form helices having a particular pitch. Preferably, the helical pitch is such that the helical angle is around 15 degrees.

The resulting yarn 14 is then treated to promote inter-tubal interactions and to increase load transfer between nanotubes, thereby increasing bulk tensile strength. One such treatment is to densify the nanotubes. Another treatment is to cross-link the nanotubes.

Carbon nanotubes are particularly useful because they are inherently flexible. Therefore a yarn made from such carbon nanotubes will not be stiff, but will in fact have considerable flexibility. Such a yarn can therefore easily be passed through a conventional stitching machine.

In many composite materials 10, a resinous matrix 16 fills interstitial spaces between the various structural elements of the material. As a result, it is particularly useful to pre-treat the yarn 14 to promote bonding between the yarn 14 and this resinous matrix 16. This can be carried out in several ways.

One way to promote bonding between the yarn 14 and the resinous matrix 16 is to infiltrate the yarn 14 itself with B-stage epoxy.

Another way to promote bonding between the yarn 14 and the resinous matrix 16 is to infiltrate the yarn 14 with a pre-treatment resin that fuses with the resinous matrix 16. Preferably, the pre-treatment resin penetrates all the way through the fibers so that more than just the surface of the yarn interacts with the resinous matrix 16. The resulting yarn is preferably greater than 50% carbon nanotube by volume with the balance being taken up by the pre-treatment resin. Suitable pre-treatment resins for this application are thermoset materials, such as epoxy or a polyimide, both of which require curing as part of the manufacturing process. Other pre-treatment resins include thermoplastics, such as PEEK, PEI, urethanes, and thermoplastic polyimides.

A third way to promote such bonding avoids adding material to the yarn 14. Instead, this method involves conditioning the yarn 14 to promote absorption of resin from the resinous matrix 16 during reflow and curing. Such absorption will promote swelling of the yarn 14, thus creating a mechanical interlock between the composite material 10 and the yarn 14.

In a yarn 14 spun from carbon nanotubes, the spacing between nanotubes is very small. This promotes capillary action. In particular, for low surface-tension liquid, the resulting capillary pumping pressure can be quite high. As a result, when passed through an environment such as the resinous matrix 16, the yarn 14 can wick prodigious quantities of liquid from the surrounding resin, thus causing the yarn 14 to swell. The now swollen yarn 14 then forms mechanical interlocks with the resinous matrix 16 all along its length. This promotes resistance to delamination.

Moreover, since at the time of stitching the yarn 14 has not yet become swollen, the stitching process can proceed smoothly, without being hampered by the need to handle swollen yarn 14. It is only after the yarn 14 is safely in place within the composite material 10 that it begins to transition into a state that promotes mechanical interlocking with the surrounding resinous matrix 16.

The ability to mechanically interlock with its surroundings is not the only advantage of the swollen yarn 14. Such a yarn 14 also develops an advantageous stress-strain curve. Prior to wicking, the yarn's deformation encompasses a plastic range and an elastic range. Having a plastic range is disadvantageous because a yarn 14 that has been deformed to such an extent does not recover its original shape. On the other hand, after having become swollen, the yarn 14 has essentially no plastic state. Its deformation is primarily elastic. Moreover, the elastic response becomes far less non-linear than it was prior to becoming swollen.

Although the yarn 14 will ultimately spend most of its time bonded to the resinous matrix 16 of the composite material 10, it still has to be stitched into place. This is generally carried out with a stitching machine. As a result, it is useful for the yarn 14 to have properties that will enable it to interact smoothly with a typical stitching machine. One way to do this is to use a sizing agent on the yarn 14. Examples of such sizing agents include a friction-reducing film, which can be solid or liquid, and a coating of spalling, such as from graphite. Sizing agents preferably have the property that although they ease passage of the yarn 14 through the stitching equipment, they have little or no effect on the interaction between the yarn 14 and the resinous matrix 16 of the composite material 10.

Figure 2:
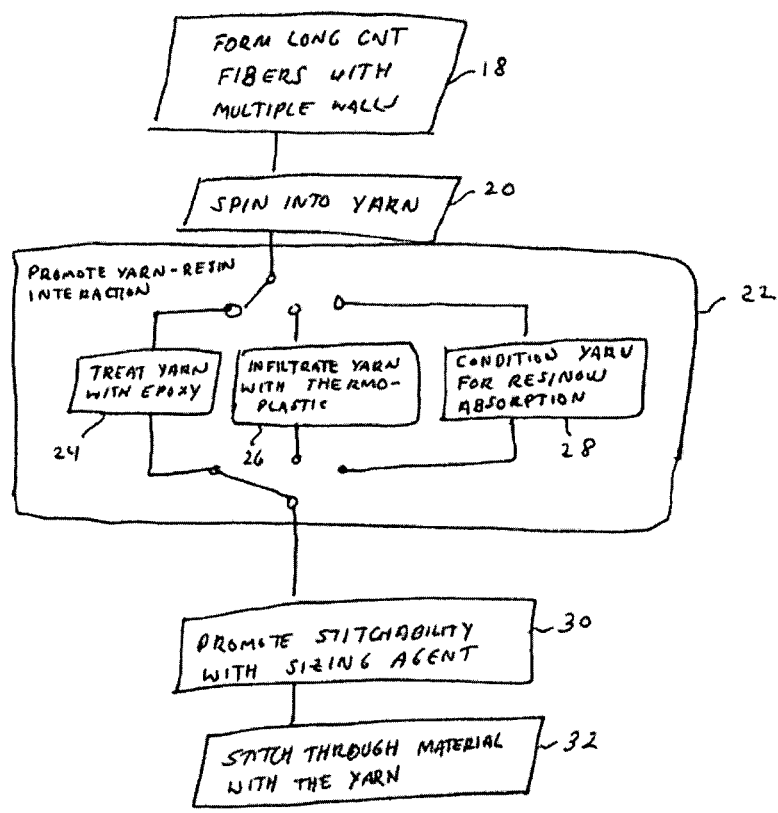
FIG. 2 shows steps in the manufacture of the composite material shown in FIG. 1.

FIG. 2 shows a procedure for manufacturing the reinforced composite material 10 shown in FIG. 1. The procedure begins with forming carbon nanotube fibers with lengths long enough to spin the fibers into yarn 14 (step 18). This can be carried out by forming them at elevated temperatures, such as temperatures above 1000 C, and in particular, at or substantially around 1100 C.

The next step is to then spin the yarn 14 (step 20). In principle, one could now proceed directly to stitching the yarn 14 through the composite material (step 32). However, to promote strength, it is useful to promote interaction between the yarn 14 and the resinous matrix 16 (step 22). This can be carried out in one of three ways: by infiltrating the yarn 14 with epoxy (step 24), by infiltrating it with thermoplastic (step 26), or by conditioning the yarn 14 for absorption of the resin (step 28).

For mass production, it is useful to also pre-treat the yarn 14 so that a commercial stitching machine can easily stitch it into the composite material (step 30). This involves application of a sizing agent. Finally, the yarn 14 is ready to actually be stitched through the composite material 10 (step 32).

Having described the invention, and a preferred embodiment thereof, what is claimed as new, and secured by Letters Patent is:

1. A method for manufacturing a composite material, said method comprising forming carbon nanotubes, spinning said carbon nanotubes into a yarn comprising four strands of carbon nanotube fibers, treating said yarn with a pre-treatment of a thermoplastic resin to promote swelling of the yarn, wherein the pre-treatment is with at least one of the thermoplastic resins selected from the group consisting of PEEK, PEI, urethane or polyimide, passing said yarn through a plurality of layers having interstitial spaces filled with a resinous matrix, swelling the yarn and allowing the pre-treatment thermoplastic resin to fuse with the resinous matrix.

2. The method of claim 1, wherein said yarn is also pre-treated with sizing prior to passing said yarn through the plurality of layers.

3. The method of claim 1, wherein said yarn is pre-treated with spalling prior to passing said yarn through the plurality of layers.

4. The method of claim 1, wherein said yarn is pre-treated with a friction-reducing film prior to passing said yarn through the plurality of layers.

5. The method of claim 1, wherein the thermoplastic is selected from the group consisting of PEEK and PEI.

6. The method of claim 1, wherein the thermoplastic is a urethane-based plastic.

7. The method of claim 1, wherein the thermoplastic is a polyimide.

8. The method of claim 1, wherein forming carbon nanotubes comprises forming said carbon nanotubes at a temperature higher than 1000° C.

9. The method of claim 1, wherein the yarn is passed through the plurality of layers in a direction normal to a horizontal plane defined by the plurality of layers.

10. The method of claim 1, wherein the yarn is passed through the plurality of layers at an angle to a horizontal plane defined by the plurality of layers.

11. The method of claim 1, wherein the pre-treatment resin penetrates all the way through the yarn.

12. The method of claim 1, wherein the four stands of carbon nanotube fibers form a helical pitch having a helical angle of about 15 degrees.

13. The method of claim 1, wherein the yarn is further coated with a friction-reducing film.

* * * * *